Patented Oct. 27, 1925.

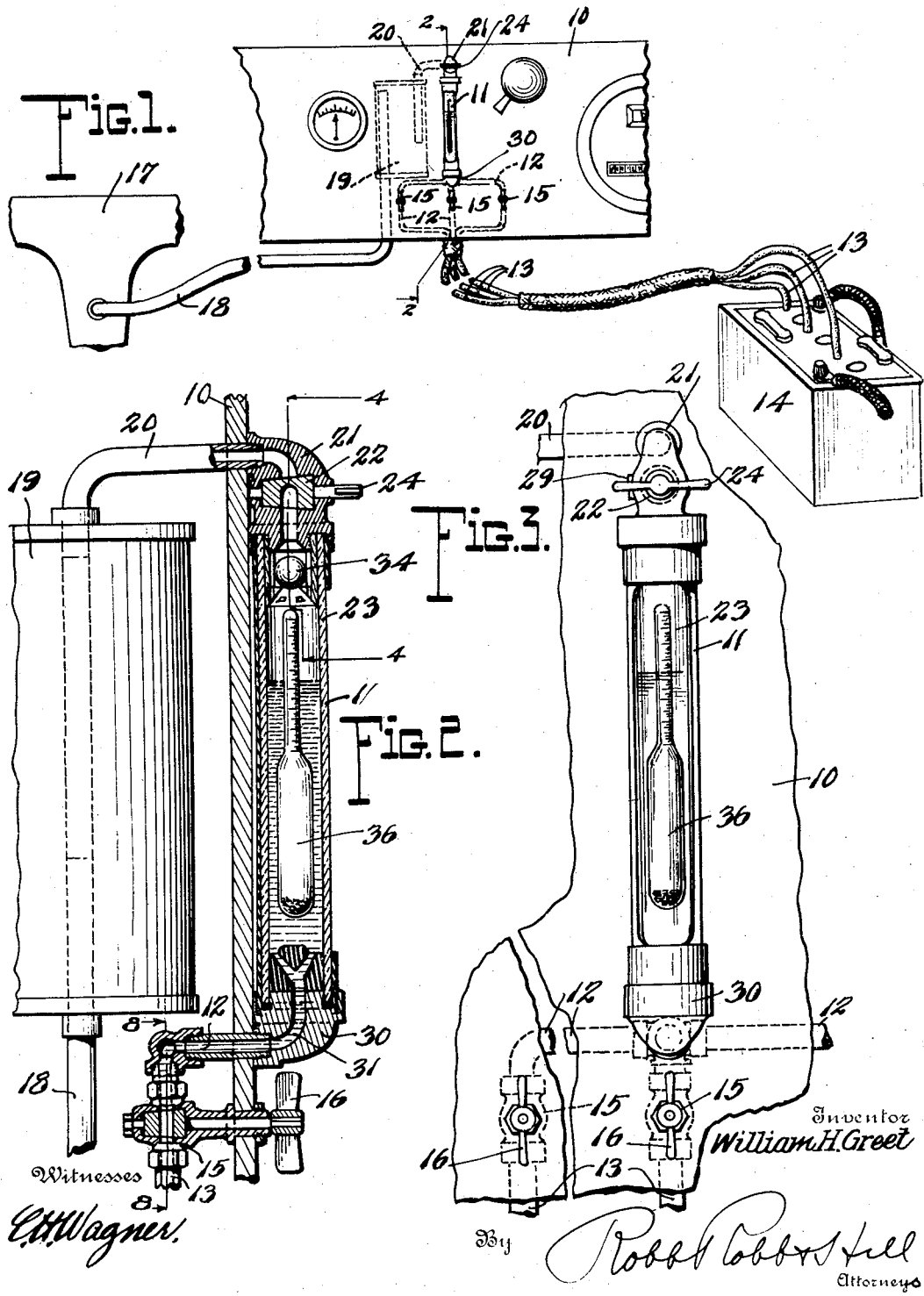

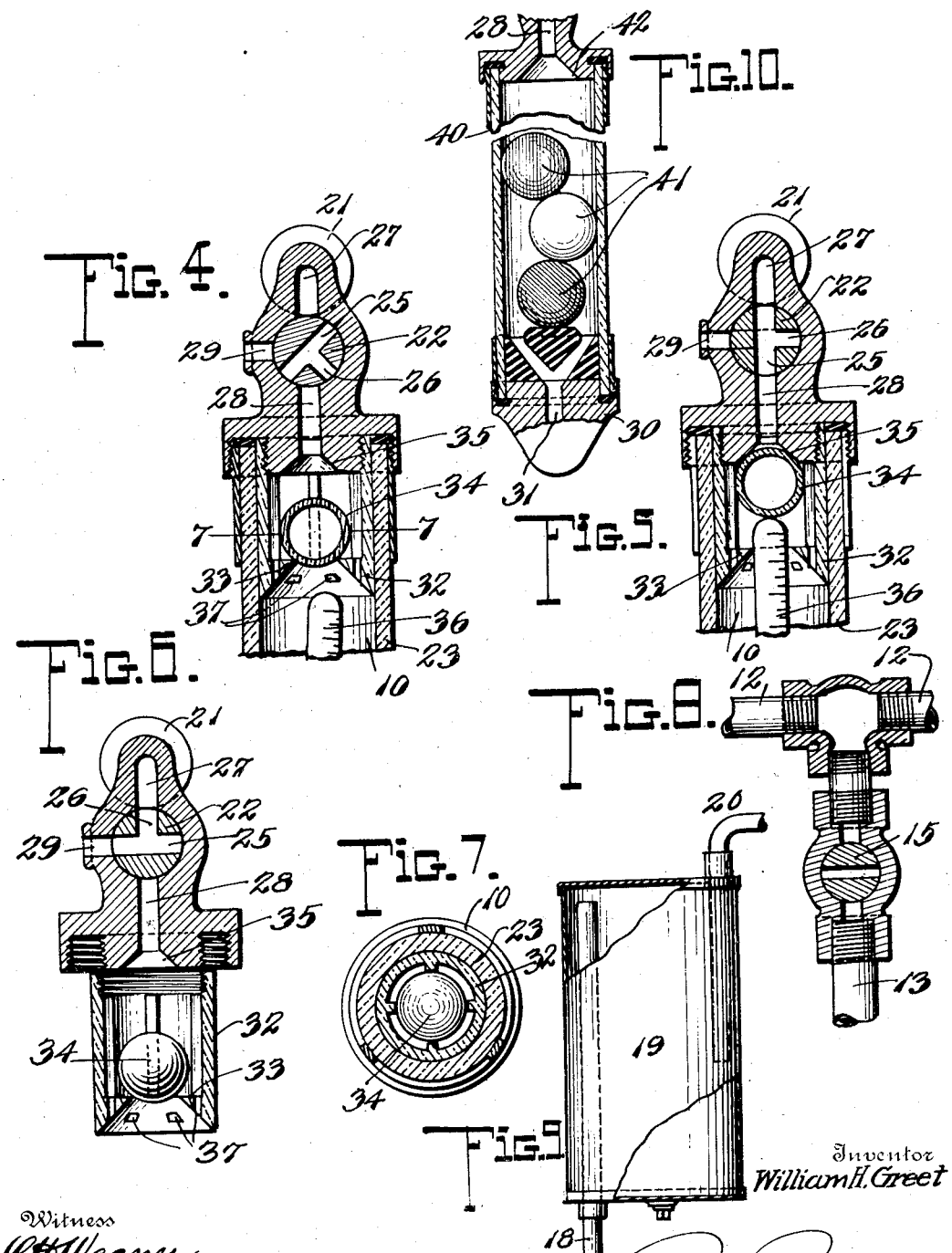

1,559,421

UNITED STATES PATENT OFFICE.

WILLIAM H. GREET, OF STARKVILLE, COLORADO.

BATTERY-TESTING APPLIANCE.

Application filed November 29, 1924. Serial No. 752,987.

*To all whom it may concern:*

Be it known that I, WILLIAM H. GREET, a citizen of the United States, residing at Starkville, in the county of Las Animas and State of Colorado, have invented certain new and useful Improvements in Battery-Testing Appliances, of which the following is a specification.

This invention relates to a battery testing appliance, and particularly to a construction adapted to effect a hydrometer reading to determine the specific gravity of the electrolyte of each battery cell at a convenient position removed from the battery.

In the practical application of such an appliance it is very desirable to dispose the hydrometer casing upon the instrument board of a vehicle and in such use a simple construction involving a minimum of parts is an important consideration. For that purpose I have devised an arrangement involving a single hydrometer having a plurality of separately controlled conduits leading to the battery cells in connection with means by which any one of said cells may be placed in communication with the hydrometer float.

In order to conduct the liquid from the battery cell to the hydrometer float an air suction or tension is required and the usual hand bulb is not sufficient for the purpose so that provision is herein made to utilize the suction present in the engine intake manifold thereby securing a constant tension which is controlled by a multiple way valve adapted in one position to draw the liquid from the battery cell to the hydrometer float; then when shifted to cut off such tension and hold the liquid within the hydrometer casing. After the reading is completed the valve is shifted to admit atmospheric pressure causing the return of the liquid to the battery cell. The control valve may also be shifted to a position to provide for a supplemental air intake for the engine manifold.

The invention has for an object to provide a novel and improved construction wherein the hydrometer casing is connected by branch ways provided with cut off valves each of which control a separate conduit leading to a battery cell so that the electrolyte from said cell may be introduced into the hydrometer casing by a selective operation of the desired valve.

A further object of the invention is to provide an improved construction whereby the suction or air tension applied to the hydrometer casing for the purpose of withdrawing the liquid from the battery cell may be controlled by a multiple way valve adjustable to fill the hydrometer casing with such liquid, retain it therein and subsequently return the liquid to the battery cell.

Another object of the invention is to provide an arrangement of parts embodying a vacuum chamber to permit the application of an air tension from an engine intake manifold to the hydrometer casing for the purpose of introducing the battery liquid therein.

Other and further objects and advantages of the invention will be hereinafter set forth and the novel features thereof defined by the appended claims.

In the drawing:

Figure 1 is an elevation with parts in perspective of the invention applied;

Figure 2 is an enlarged vertical section through the hydrometer casing and connections, taken on the line 2—2 of Figure 1;

Figure 3 is a front elevation thereof;

Figure 4 is a detail section on the line 4—4 of Figure 2;

Figure 5 is a similar view with the control valve shifted in position;

Figure 6 is a like view with the valve in further shifted position;

Figure 7 is a detail section on the line 7—7 of Figure 4;

Figure 8 is an enlarged section of one of the cut off valves;

Figure 9 is an elevation with parts broken away of the vacuum chamber; and

Figure 10 is a detail section of a modified form of hydrometer casing.

Like numerals refer to like parts in the several figures of the drawing.

The invention is adapted for any desired application where the reading of the specific gravity of the electrolyte of the battery cells is to be taken at a position removed from the battery and in the particular disclosure herein the invention is shown as applied to the instrument board 10 of a vehicle. In such a case it is desirable to place upon the board a single instrument such as the hydrometer casing 11 and this may be of the ordinary type for the purpose of securing such a reading of specific gravity. This hydrometer casing is connected by branch lines 12 with a plurality of tubes or conduits 13 leading to the separate cells of a battery as indicated at 14, the number of these conduits and the connections therefrom being dependent upon the number of cells in the battery. Each of the connections 12 is provided with a cut off valve 15 of any preferred character and preferably provided with an operating handle 16 disposed upon the instrument board 10. By these means the fluid from any one of the battery cells may be introduced into the hydrometer casing for a reading of its specific gravity.

For the purpose of this introduction of the electrolyte from the battery cell to the hydrometer casing an air suction or tension is used and while this may be supplied from any desired source still the most convenient application thereof for a motor vehicle is by a connection with the intake manifold 17 thereof through a pipe line 18 leading therefrom to a vacuum chamber 19 from which it is carried by a pipe 20 to the coupling or valve casing 21 which communicates with the upper end of the hydrometer casing. This vacuum chamber provides for maintaining a constant tension which will not be affected by the engine intake and renders the appliance operable even though the engine is not running.

In the application of such air tension it is necessary to control the same in its relation to the hydrometer casing and for that purpose a multiple way valve 22 is introduced into the coupling 21 which seats upon the glass tube 23 of the hydrometer casing 11. In the present instance this valve is shown as comprising a three way cock having an operating handle 24 conveniently accessible above the instrument and the body thereof provided with a channel 25 and an intersecting channel 26 which in the various shifted positions of the valve are adapted to cooperate with a suction channel 27 and a channel 28 communicating with the hydrometer casing. The coupling or valve casing is also provided with an air opening 29 by which the channels of the valve may be brought into communication with the atmospheric pressure to be introduced either into the hydrometer casing or into the engine connection. The lower end of the transparent tube 23 may be seated in a suitable coupling 30 through which a channel 31 extends and communicates with the branch lines 12 leading to the several battery cells.

When the air suction is applied the liquid is withdrawn from these cells and fills the tube 25 and unless the valve is moved to a cut off position this liquid is liable to be drawn into the vacuum chamber. To prevent such action a proper checking valve may be provided and one instance thereof is shown as comprising a valve cage 32 dependent from the coupling 21 and provided at its lower portion with a supporting flange 33 for the support of a ball valve 34 which is adapted to cooperate with the valve seat 35 when such ball is forced upward to cut off the flow of fluid beyond the hydrometer tube. This cut off is effected by engagement of the upper end of the hydrometer float 36 with said ball as indicated in Figure 5, the float being constantly raised as the liquid is introduced into the tube 23. For the purpose of permitting the free action of the air when the ball is resting upon the flange 33 suitable apertures 37 have been provided therethrough so that the checking action of the ball is only against a flow of the liquid beyond the hydrometer casing.

A modified form of hydrometer casing is shown in Fig. 10 in which the tube 40 contains floats or balls 41 of different specific gravity and preferably of contrasting colors. When the tube is filled with liquid from the battery these balls are floated thereby relative to the specific gravity of the electrolyte and the floated ball may cooperate with a seat 42 at the top of the hydrometer casing to prevent overflowing by continued suction.

In the operation of the appliance it may be assumed that the parts are in the position shown in Figure 4 where the control valve cuts off all air suction from the hydrometer casing and the battery is operating under its normal condition. If it be desired to secure a reading of the specific gravity of the electrolyte this valve is shifted to the position shown in full lines by Figure 5 so that the air suction tends to withdraw the liquid from a selected battery cell and fill the hydrometer casing therewith. In case the control valve is not again shifted to the position shown in Figure 4 to cut off the suction the ball valve therein is automatically actuated by the float for that purpose. When this suction is cut off either by the control valve or ball, the reading may be taken at leisure and thereafter the liquid returned to the battery cell by shifting the valve to the dotted line position shown in Figure 5 by which the atmospheric pressure is introduced through the coupling to the hydrometer casing. Under some conditions it may be desirable to utilize this appliance for the purpose of introducing a supplemental air feed to the intake manifold of the engine and for that purpose the valve passage may be shifted to the position shown in Figure 6 which renders the hydrometer inoperative during such period.

The construction shown presents a single hydrometer casing upon the instrument board which is connected through the branch lines and cut off valves so that the liquid from any of the battery cells may be properly tested and returned thereto through the selective arrangement of such valves while the introduction of the vacuum chamber maintains a constant vacuum means ready for use even though the engine is not in operation. It will be obvious that such a chamber could be omitted and the connection made directly with the engine manifold.

The specific details of this appliance have been herein shown and described but the invention is not confined thereto as changes and alterations may be made in the character of the indicating instrument and the connections therefrom without departing from the spirit of the invention as defined by the following claims.

Having thus described my invention, what I claim as new and desire to secure by Letters Patent is:—

1. In a battery testing appliance, an indicating instrument, a plurality of ways leading therefrom provided with independent cut off means, a plurality of conduits extending from said ways to the separate cells of the battery, means for applying an air suction to said indicating instrument comprising an air tension line extending therefrom to the engine manifold, and a controlling valve in said air line intermediate the instrument and source of air suction adapted to establish communication with the instrument or with atmospheric pressure.

2. In a battery testing appliance, an indicating instrument, a plurality of ways leading therefrom provided with independent cut off means, a plurality of conduits extending from said ways to the separate cells of the battery, means for applying an air suction to said indicating instrument comprising an air tension line extending therefrom to the engine manifold, and a vacuum chamber introduced in said tension line between the engine manifold and said instrument.

3. In a battery testing appliance, a hydrometer casing, a communication extending therefrom to a battery cell, an air tension line extending from said hydrometer casing to the intake manifold of an engine, and means to selectively establish communication between the hydrometer casing and said air tension or to cut off said tension and establish atmospheric pressure intermediate thereof and said hydrometer casing.

4. In a battery testing appliance, a hydrometer casing, a communication extending therefrom to a battery cell, an air tension line extending from said hydrometer casing to the intake manifold of an engine, and a vacuum chamber introduced into said tension line intermediate the hydrometer casing and engine manifold to maintain a constant tension applicable to said casing.

5. In a battery testing appliance, a hydrometer casing, a communication therefrom to a battery cell, a source of air suction, a valve casing communicating with said hydrometer casing and source of suction, a multiple way valve in said casing having channels adapted to selectively establish communication between the hydrometer casing and the source of air suction or to cut off said suction and establish communication between the atmospheric pressure and said hydrometer casing.

6. In a battery testing appliance, a hydrometer casing, a communication therefrom to a battery cell, a source of air suction, a valve casing communicating with said hydrometer casing and source of suction, a controlling valve having angularly disposed channels therethrough adapted in the shifted positions of said valve to establish a suction within said hydrometer casing or to introduce atmospheric pressure therein by communication with an air port in the valve casing, and means controlled by contact with a hydrometer float for cutting off the air suction as the hydrometer casing fills with liquid.

7. In a battery testing appliance, a hydrometer casing, a connection therefrom with a battery cell, a suction connection communicating with the upper end of said hydrometer casing through a valve casing, and a ported valve in said valve casing adapted in its shifted positions to apply the air suction to the hydrometer casing, cut off suction, or introduce atmospheric pressure to said hydrometer casing, said valve being further shiftable to permit the entrance of atmospheric pressure into the suction line communicating with the engine manifold.

8. In a battery testing appliance, a hydrometer casing, a communication therefrom with a battery cell, a source of suction communicating with the upper end of said hydrometer casing, a valve cage dependent from said casing, and a valve member disposed in said cage and cooperating with a seat, said valve within the cage being operable by contact therewith of the float within the hydrometer casing.

9. In a battery testing system comprising an instrument for determining the specific gravity of a battery electrolyte, means for selectively connecting independent cells of the battery with said instrument, a source of air tension communicating with the instrument, and means for controlling said tension disposed between the instrument and source of air tension and adapted to cut off the tension and establish atmospheric communication with said instrument.

In testimony whereof I affix my signature.

WILLIAM H. GREET.